May 12, 1942.  P. E. HAWKINSON  2,282,579
METHOD OF RETREADING TIRE CASINGS
Filed April 19, 1940

Inventor
Paul E. Hawkinson
By his Attorneys

Patented May 12, 1942

2,282,579

UNITED STATES PATENT OFFICE 2,282,579

METHOD OF RETREADING TIRE CASINGS

Paul E. Hawkinson, Minneapolis, Minn., assignor to Paul E. Hawkinson Company, Minneapolis, Minn., a corporation of Minnesota Application April 19, 1940, Serial No. 330,514

10 Claims. (Cl. 18—59)

My present invention relates generally to the art of tire retreading, and more particularly relates to improvements in that class of tire retreading wherein new tread material, usually uncured tread rubber, is cured or vulcanized to the peripheral portion of the tire casing under heat and pressure, without the use of a tread confining mold, and by subjecting the treaded casing to heated fluid under relatively high pressure.

This general class of retreading without the use of molding equipment has become known as "kettle curing," since such processes usually involve applying an uncured tread material to the tire casing, and then placing the newly treaded casing in a large chamber known as a "kettle," wherein there is maintained live steam under pressure. The heat of the steam serves to bring the newly applied tread material or rubber up to a curing or vulcanizing temperature, while the pressure of the steam exerted directly on the exposed surface areas of the casing and new tread serves to retain the tread in place against flowing action, and to maintain the same under pressure, which is a requirement for satisfactory curing. The main advantage in these hitherto employed systems or methods of retreading by direct subjection of the treaded casing to live steam under pressure is the fact that expensive molding equipment is eliminated.

However, the quality of work previously produced by these so-called "kettle cure" processes has been generally recognized as being inferior to retreading done in conventional molding equipment; the main causes for complaint against kettle cure retreads having been relatively rapid tread wear, as compared to retreads cured in molds, and further, the much greater frequency of separation of the new tread from the tire casing in service of kettle cure retreads as compared to mold cure retreads. The reasons for this more rapid tread wear and more frequent tread separation in connection with kettle cured treads as compared to mold cured treads is no doubt largely due to the fact that the pressure produced by steam on the new tread material is proportional to the temperature of the steam, and since the maximum temperature to which a tire casing can be subjected without serious danger is limited to a point whereat the pressure produced by the steam is relatively very low as compared to pressures employed in mold curing practice, the cured tread is not bonded as tightly to the casing as in mold practice and the tread rubber is cured in a less compacted or more spongy condition than in mold curing practice wherein much higher pressures are employed. In this connection, it may be said that in conventional mold curing practice the new tread is cured usually at a temperature of approximately 275 degrees, and under a pressure of approximately one hundred (100) pounds per square inch upward, whereas at this same temperature a treaded casing cured by steam in a kettle would be subjected to a pressure of only approximately 45 pounds per square inch.

The present invention takes the above noted shortcomings of the so-called kettle cure method of retreading into consideration and provides a new method of kettle curing which very materially improves the results obtained by the finished product by increasing tread wear and greatly decreasing the frequency of tread separation. An important objective of the present invention is the provision of a new method whereby an annular band of tread material may be cured to the peripheral crown portion of a tire casing while the new annular tread material and the peripheral crown portion of the casing are maintained in a materially radially and circumferentially contracted condition, so that the cured tread will be stretched and maintained under tension to contract to its cured radius and circumference when the tire casing is subsequently inflated to its normal service condition. In this connection it may be said that the benefits of curing a new annular tread to a tire casing while the peripheral crown portion of the tire casing and the new tread material are maintained in a materially radially and circumferentially contracted condition are now widely recognized, but that the present method is believed to be the first whereby this important objective can be accomplished in connection with a method wherein the new tread material is cured to the peripheral crown of the casing by direct application to the new tread material of heated fluid under pressure. The improved method and numerous objectives and advantages thereof including the above noted and others will be made apparent from the following specification and claims, together with the appended drawing. In the accompanying drawing, like characters indicate like parts throughout the several views.

Referring to the drawing.

Figure 1:
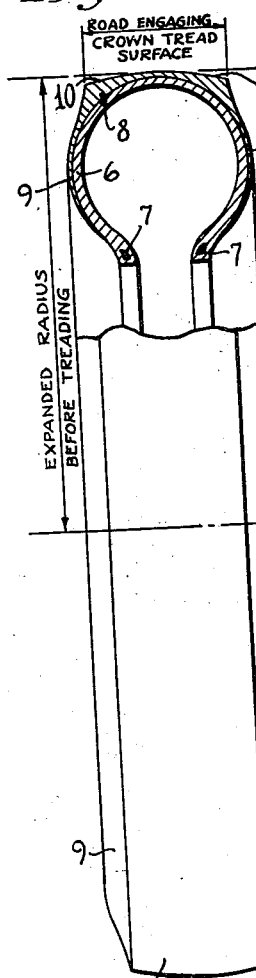
Fig. 1 is a view illustrating a worn tire casing in a shape normally assumed thereby, some parts of the tire being broken away and some parts being shown in transverse section.

The tire casing shown in the drawing is representative of an average pneumatic tire casing after it has been worn down to the point where it is ready for retreading and in Fig. 1 this casing is illustrated in the normal substantially undistorted condition. This tire casing, as illustrated, comprises a carcass 6 having reinforced rim engaging beads 7, a tread 8 applied over the peripheral crown portion of the carcass, and side wall protecting rubber 9 applied over opposite side walls of the carcass radially inwardly of the heavy tread 8. The carcass 6 is assumed to be of the conventional so-called cord type wherein a plurality of layers of cords of cotton rayon or other suitable substance extends diagonally from bead to bead of the tire and are adhered together but insulated apart by a soft rubber composition, which permits considerable but limited movement of the cords one with respect to the other. By reference particularly to Fig. 1 it will be seen that the annular road engaging crown surface of the original tread material 8 is relatively flat in transverse section as compared to the normal substantially circular cross sectional contour of the underlying carcass 6, so that the worn original tread is relatively very thin at its transverse center and has relatively very thick shoulder tread portions radially under the laterally spaced edges 10 of the road engaging crown surface of the original tire material.

The first step in carrying out my improved process consists in preparing the worn casing for reception of a new tread material and in carrying out the improved method in the preferred manner herein described. This is usually accomplished by buffing the relatively flat worn road engaging tread surface of the original tread material between the edges 10 thereof just sufficiently to true the same up and to clean and roughen the same to provide a good bonding surface. Preferably this buffing operation will be confined to the relatively flat crown surface of the original tread and will not materially reduce the thickness of the worn tread material. To complete the preparation of the casing for reception of the new tread material, the buffed road engaging crown surface of the original tread material is usually given a coat of rubber cement.

The next step in carrying out the method in the preferred manner is to radially contract the road engaging crown portion of the carcass from a substantially normal or expanded radial condition as shown in Fig. 1 to a very materially contracted condition substantially representing the radial measurement of the road engaged portion of the tire under normal load. This last step is preferably accomplished by laterally spreading the beads 7 of the tire, while maintaining the same in substantially parallel relation, from their normal position shown in Fig. 1, to substantially the spread condition represented in Fig. 2. This spreading of the beads is most conveniently accomplished by commercially available power operated spreading devices preferably of the inside arm type, but for the purpose of the present illustration, this spreading of the beads is illustrated as being accomplished by a plurality of hand spreaders 11 applied at circumferentially evenly spaced points about the beads of the tire.

The spreading devices 11 each comprise a handle equipped stem 12 provided with left and right hand screw threads at their opposite end portions, and bead engaging nut acting spreader lugs 13 that are mounted on opposite screw threaded end portions of the stem 12. In spreading the tire, it is highly desirable to space the spreading devices approximately equally and to spread the same equally so that the beads of the tire will be maintained in substantially parallel relation, which will in turn result in even circumferential and radial contraction of the peripheral or road engaging crown portion of the tire. Of course, the contraction of the peripheral or road engaging crown portion of the tire under lateral spreading action of the beads is the direct result of the diagonal disposition of the cords in the carcass.

The next step in carrying out the method in the preferred manner is the applying to the buffed and cemented road engaging crown surface of the original tread material, intermediate the edges 10 thereof and while the peripheral crown portion of the casing is in a radially and circumferentially contracted condition with its beads spread, an annular band of new tread material 14. The annular band of new tread material 14 will usually be uncured tread stock and this will be rolled or otherwise applied to the cemented and buffed crown of the original tread in a manner to provide a fluid tight bond between the new and old material. This obtaining of a fluid tight bond between the new and old material is particularly important in connection with processes wherein pressure on the new tread rubber is obtained by direct surface contact with the fluid under pressure, since if the fluid under pressure is permitted to work its way between the new and old material, the effect of the pressure in producing a strong bond between the new and old material will be lost.

Figure 2:
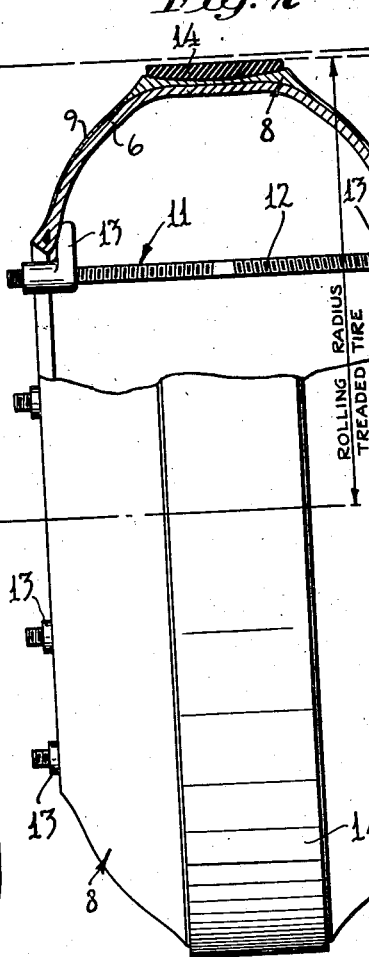
Fig. 2 is a view similar to Fig. 1 but illustrates the beads of the casing as being laterally spread apart, so as to materially contract the road engaging crown portion of the casing, and a new tread material applied to the contracted crown.

Whereas I prefer to apply the tread material while the casing is in a laterally spread circumferentially contracted condition as shown in Fig. 2, and as described above, attention is called to the fact that the process can be carried out by applying the new tread material to the casing while it is in a more or less normal condition as shown, for example, in Fig. 1, and the newly treaded casing thereafter laterally spread and circumferentially contracted to the condition shown in Fig. 2. This latter procedure, however, makes circumferential contraction of the crown portion of the casing more difficult and has a tendency to weaken the bond between the new and old tread materials; the former of which is still in an uncured state.

Figure 3:
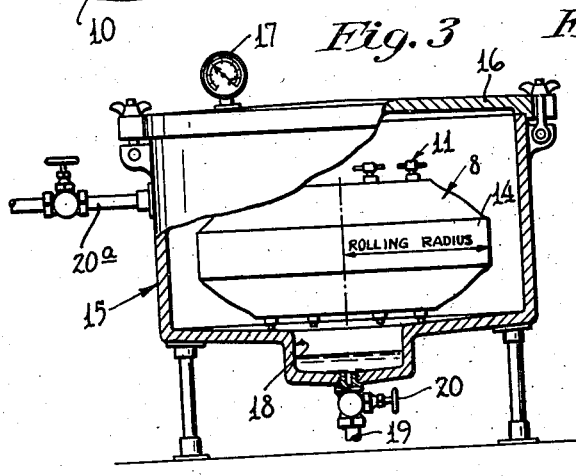
Fig. 3 is a view illustrating the tire in the condition shown in Fig. 2 placed in a steam kettle.

The next step in the process consists in subjecting the laterally spread circumferentially and radially contracted casing with its newly applied tread material to complete interior and exterior surface contact with heated fluid under pressure, whereby to cure the newly applied tread material to the crown portion of the casing while said crown portion is in said circumferentially and radially contracted condition. This phase of the process is preferably accomplished by placing the laterally spread circumferentially contracted casing, as represented in Fig. 2, in a suitable steam kettle, indicated as an entirety by 15, as shown in Fig. 3. In the present illustration, the steam kettle is shown as being provided with a removable cover 16 carrying a steam pressure gauge 17. The bottom of the kettle 15 is shown as being provided with a condensation sump 18 leading from which is a drain pipe 19 that is normally closed by a valve 20. Steam under pressure is admitted to the interior chamber of the kettle 15 by steam inlet pipe 20a. After the treaded tire is placed in the mold and the cover closed and sealed, steam under pressure will be admitted through the pipe 20a from a suitable boiler not shown, and a steam pressure of thirty-five (35) to forty-five (45) pounds will be built up and maintained during the curing operation, the length of which will depend on the actual steam temperature and pressure maintained and the thickness of the new tread being applied.

When the curing operation has been completed, the tire will be removed from the kettle and the beads released from lateral spreading action by removing the spreaders 11. When the spreaders are removed the casing, through its own natural tendency to return to a normal condition as shown in Fig. 1, will expand circumferentially and contract laterally although this action will be retarded and, in fact, stopped before the casing returns fully to a normal condition, by the contracting pressure exerted by the circumferentially short new tread material 14 which was cured on in a radially and circumferentially short condition substantially representing the rolling radius of the casing. However, when the tire is equipped with the customary inner tube 21 and wheel rim 22 and inflated, as shown in Fig. 4, the tire casing will be returned to a normally expanded condition and the newly applied tread material 14 will be maintained in a stretched condition from which it will tend to contract back to the radially and circumferentially short condition in which it was cured.

In retreading tires, it is usually desirable to decrease to some extent the radius of the cross sectional arc of the road engaging crown surface of the new tread material as compared to the relatively flat road engaging crown surface of the worn tire before retreading. The desirability of thus doing arises from the fact that the treads of most tire casings wear off somewhat more at their transverse central portions in service than at the transverse edges of their road engaging crown surface so that it becomes desirable in retreading the tire to restore the road engaging crown surface of the tread to a normal more rounding contour transversely, although the cross sectional contour of the road engaging crown of the finished tread, upon inflation, will still be relatively flat as compared to the substantially circular inflated contour of the carcass. To this end, it will be noted by reference to Fig. 2 that the new tread material 14 has a transversely convex inner surface, and by reference to Fig. 2 it will be seen that the road engaging crown surface of the original tread material assumes a transversely concave shape when the beads of the tire are spread as illustrated in Fig. 2. In most instances the concavity of the crown surface of the original tread material will substantially match the convexity of the new tread material so that the road engaging crown surface of the new tread material will be cured in a substantially transversely flat condition which is the condition thereof when on the road under load.

Figure 4:
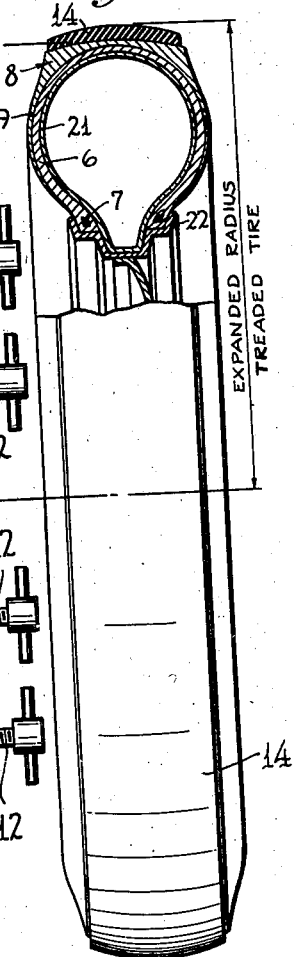
Fig. 4 is a view illustrating the casing after it is removed from the kettle and inflated.
Figure 5:
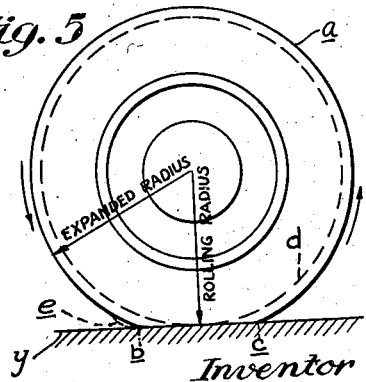
Fig. 5 is a diagrammatic view illustrating a conventional pneumatic tire in side elevation as it appears under load.

In Fig. 5 the inflated casing of Fig. 4 is illustrated as it appears in side elevation when on the road under normal load, a road bed being indicated by $y$. In Fig. 5 those portions of the peripheral road engaging crown surface of the tire which are not in engagement with the road are indicated by the outer arcuate full line $a$ and the expanded radius of the casing is indicated by an arrow marked "Expanded radius"; also that part of the road engaging crown surface of the tire actually in engagement with the road, is shown on the straight line $y$ of the road bed between points $b$ and $c$. The reduced rolling circumference of the tire is shown by dotted circle $d$ in Fig. 5 and the rolling radius is indicated by the arrow marked accordingly. In tires wherein the road engaging treads are cured in an expanded radius condition the forced reduction in radius and circumference thereof between points $b$ and $c$, as a result of tire distortion caused by normal load produces a surplus of tread rubber between points $b$ and $c$ which in turn produces a tread wave just ahead of the road contacted portion of the tread, as a result of the reduction in radius at the ground engaging portion when the tire is distorted at this point by the load. Such a tread wave is indicated in Fig. 5 by dotted line $e$ and results in a continual scuffing of the tread against the road at this point, which produces damaging head and rapid tread wear. However, in tires cured according to the method above set forth, the new treads are stretched and maintained under tension to contract and, in fact, do contract under engagement with the road sufficiently to eliminate or largely eliminate the tread wave present in conventionally cured tires. In other words, in tires treaded according to the present method, that portion of the tread engaging the ground merely returns by its own elasticity to a substantially neutral condition and shape approximately representing the condition and shape it assumed during the curing operation so that there is no surplus rubber to produce a tread wave such as indicated at $e$ in Fig. 5. Hence due to this fact, the tendency of the treads to wear as a result of scuffing action and the tendency of the treads to pull loose from the original tire material is so greatly relieved that the finished product will give greatly improved service as compared to treads similarly cured without a mold but to a substantially normal radius and cross-sectional contour.

It is usually desired to form a tread pattern in any new tread and since this is not accomplished during the curing process it can be readily accomplished after the tire is cured by cutting in a design with a suitable cutting tool or machine. In practice, this can usually be accomplished best by a so-called "regrooving machine."

The word "retreading" is herein used in a broad sense to cover the application of tread material to any previously cured tire casing, and this without regard to whether the purpose of adding the tread material be to replace tread material that has been worn off or otherwise removed or be simply for the purpose of treading new tire casings.

What I claim is:

1. The method of retreading a tire casing which includes the steps of circumferentially and radially contracting the crown portion of the tire at all points about its circumference by simultaneously laterally spreading the beads of the tire casing at circumferentially spaced points, applying a new annular tread over the crown portion of the casing in a manner to provide a fluid tight bond between the new tread and the original tire material, and curing the newly applied tread by subjecting the entire exterior surface area of the newly treaded tire casing to direct surface contact with a heated fluid under pressure while restraining the casing against inward collapsing action and while maintaining the beads of the tire casing in such laterally spread relation that the road engaging crown portion thereof is circumferentially and radially contracted to a diameter materially under the normal expanded diameter thereof.

2. The method of retreading a tire casing which includes the steps of laterally spreading the beads of the tire casing at circumferentially spaced points simultaneously to materially contract the entire peripheral portion of the casing circumferentially and radially to a diameter materially under the normal inflated diameter thereof, applying an annular tread circumferentially about the crown portion of the casing in a manner to provide a fluid tight bond between the new tread material and the original tire material, and curing the newly applied tread material by subjecting the entire interior and exterior surfaces of the tire casing to direct surface contact steam under pressure while maintaining the beads of the tire in such laterally spread condition that the crown portion of the casing is materially contracted radially and circumferentially at all points about its circumference.

3. The method of retreading a tire casing which consists in first preparing the crown portion of the casing for reception of a new tread, next laterally spreading the beads of the tire at circumferentially spaced points to contract the road engaging crown portion of the tire casing to a materially reduced radius at all points about its circumference, in next applying a new annular tread material over the now contracted road engaging crown portion of the tire casing in a manner to provide a fluid tight bond between the new tread and the original tire material, and in finally curing the newly applied tread material by subjecting the entire exterior surface of the newly treaded tire casing to direct surface contact with heated fluid under pressure while maintaining the beads of the tire casing in such laterally spread condition that the entire newly treaded road engaging crown portion of the tire casing is maintained in a materially circumferentially and radially contracted condition at all points about its circumference.

4. The method of retreading a tire casing which consists in first preparing the crown portion of the casing for reception of a new tread, next laterally spreading the beads of the tire at circumferentially spaced points to contract the road engaging crown portion of the tire casing to a materially reduced radius at all points about its circumference, in next applying a new annular tread material over the now contracted road engaging crown portion of the tire casing in a manner to provide a fluid tight bond between the new tread and the original tire material, in subjecting the entire interior and exterior surfaces of the newly treaded tire casing to heated fluid under pressure while maintaining the beads of the tire casing spread in approximately the manner and to approximately the extent specified.

5. The method of retreading a tire casing having a worn road engaging crown tread surface and relatively thick shoulder tread portions at the laterally spaced edges of the said relatively flat road engaging crown which consists in preparing the worn crown surface of the original tread material for reception of a new tread by buffing the worn crown surface intermediate its laterally spaced edges, in applying to the buffed flat crown surface of the original tread material an annular band of new tread material of no greater width than the width of said buffed flat crown surface and in a manner to provide a fluid tight bond between the new and old tread material, in laterally spreading the beads of the casing at all points about their circumferences to an extent necessary to contract the entire circumference of the newly treaded crown portion of the casing to a radius approximately equalling the expected rolling radius of the treaded casing and to distort the treaded road engaging crown transversely to approximately the transverse shape assumed thereby, when on the road under normal load, and in finally curing the newly applied crown tread material to the crown of the casing while the crown of the casing is retained in a materially radially and circumferentially contracted condition by forced spreading of its beads.

6. The method defined in claim 2 in which the said heated fluid is under a pressure of not less than thirty-five (35) pounds, per square inch, during the curing operation.

7. The method of retreading a tire casing which consists in first preparing the crown portion of the casing for reception of a new tread, next applying a new annular tread to the prepared crown portion of the casing about its entire circumference, in next materially contracting the newly treaded crown portion of the casing at all points about its circumference by laterally spreading the beads of the tire casing evenly at all points about the circumference, and in finally curing the newly applied crown tread material to the crown of the casing while the crown of the casing is retained in a materially radially and circumferentially contracted condition by forced spreading of its beads.

8. The method defined in claim 1 in which the heated fluid referred to is steam under a pressure of not less than approximately thirty-five (35) pounds per square inch.

9. The method of retreading tire casings which comprises the following steps, to wit: applying a new annular band of tread material over the peripheral crown portion of the tire casing in a manner to provide a fluid tight bond between the new tread and the original tire material, radially contracting the peripheral crown portion of the casing at all points about its circumference, and in curing the newly applied tread material by subjecting the exposed surfaces thereof radially outwardly of the original tire material to direct surface contact with heated fluid under pressure while retaining the treaded peripheral crown portion of the casing against expansion and in a materially radially contracted condition at all points about its circumference.

10. The method of retreading tire casings which comprises the following steps, to wit: applying a new annular band of tread material over the peripheral crown portion of the tire casing in a manner to provide a fluid tight bond between the new tread and the original tire material, radially contracting the peripheral crown portion of the casing at all points about its circumference, and in curing the newly applied tread material by subjecting the exposed surfaces thereof radially outwardly of the original tire material to direct surface contact with heated fluid under pressure while retaining the treaded peripheral crown portion of the casing against expansion and in a materially contracted condition whereat the radius of the new tread material, at all points about its circumference, closely approximates the expected loaded rolling radius of the casing when subsequently placed in service.

PAUL E. HAWKINSON.